Jan. 20, 1925.  1,523,545

J. I. LAMB

LOCKING DEVICE FOR TIRE CHAINS

Filed Nov. 23, 1923    2 Sheets-Sheet 1

Inventor
James I. Lamb
By L. B. James
Attorney

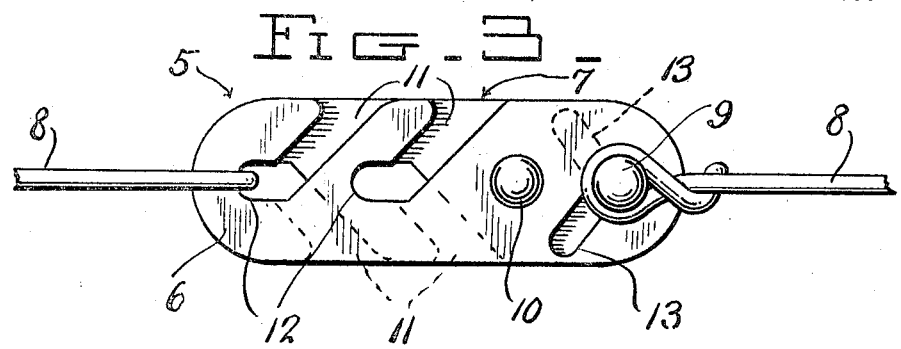
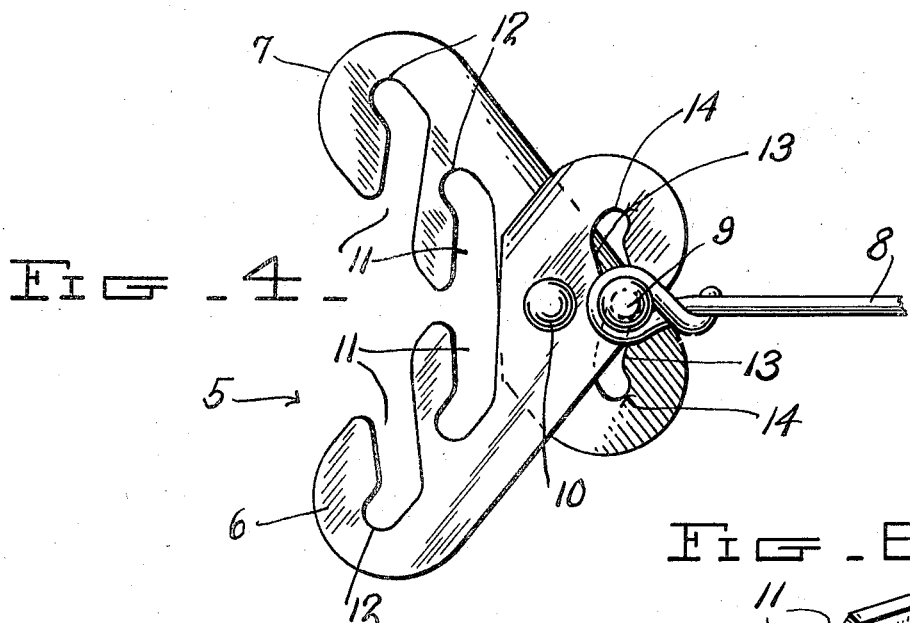
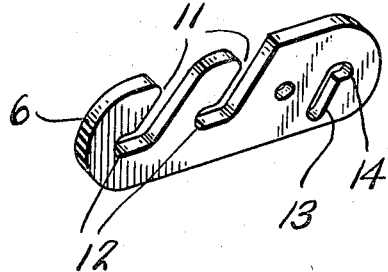
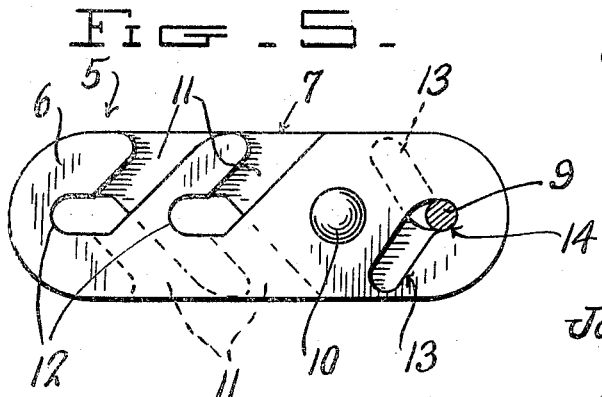

Patented Jan. 20, 1925.

1,523,545

UNITED STATES PATENT OFFICE.

JAMES I. LAMB, OF GENOA, NEBRASKA.

LOCKING DEVICE FOR TIRE CHAINS.

Application filed November 23, 1923. Serial No. 676,557.

*To all whom it may concern:*

Be it known that I, JAMES I. LAMB, a citizen of the United States, residing at Genoa, in the county of Nance and State of Nebraska, have invented new and useful Improvements in Locking Devices for Tire Chains, of which the following is a specification.

This invention relates to tire chains and more particularly to locking devices therefor.

The primary object of this invention resides in the provision of a locking device for the open ends of tire chains, which is not only adapted to securely fasten the ends of the chain together without the use of tools, but is of such construction that a further security of the locking device is obtained through the instrumentality of coacting elements.

Another object of this invention resides in the provision of a locking device, for fastening the open ends of tire chains together, consisting of coacting elements adapted to engage the ends of the chain in such manner that the tendency of the jaws to accidently open will be counteracted by means adapted to direct the gripping jaws of the device in locking position.

A still further object of this invention resides in providing a locking device for fastening the open ends of tire chains together, so that the security of the chain gripping portions thereof will be maintained through the instrumentality of the coacting elements bearing against the tire upon which the chain is fastened.

Aside from the foregoing objects this invention consists of coacting elements assembled in such manner that the circumferential strains, to which the side sections of tire chains are subjected, will be utilized to retain the gripping jaws in locked relation.

With these and other objects in views, this invention resides in certain novel features of construction, combination and arrangement of elements to be hereinafter more particularly set forth in the specification, illustrated in the accompanying drawing and pointed out in the appended claim, it being understood that the right is reserved to make such changes in construction as come within the scope of the claim.

In the accompanying drawings forming a part of this application:

Fig. 3 is an enlarged detail plan view of the locking device in closed position.

Fig. 4 is a similar view with the device in unlocked position.

Fig. 5 is an enlarged plan view of the locking device with its locking pin in section.

Fig. 6 is a detail perspective view of one of the locking jaws.

Figure 1:
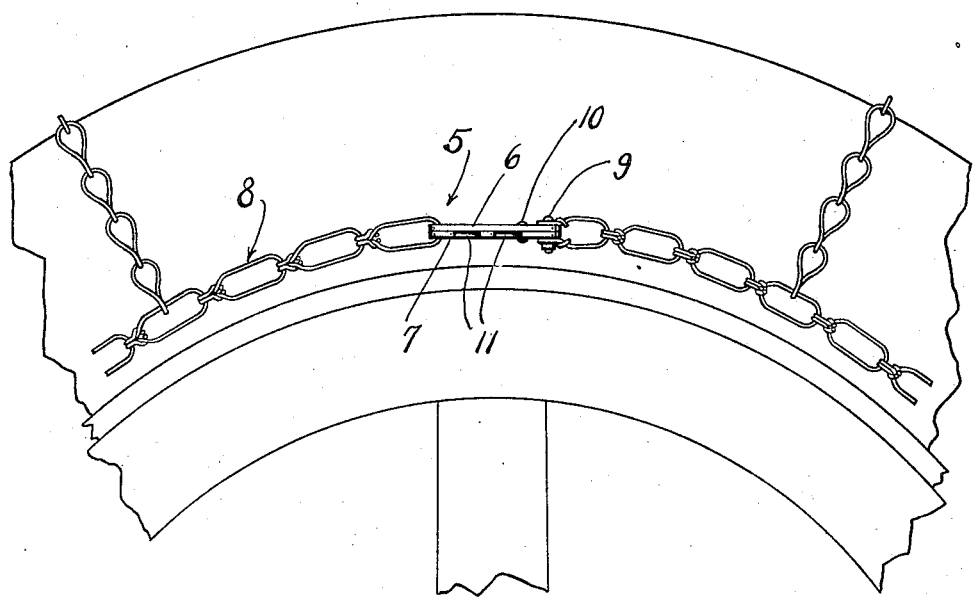
Fig. 1 is a side view of a portion of an automobile tire showing the elements of this invention in operative position thereon.
Figure 2:
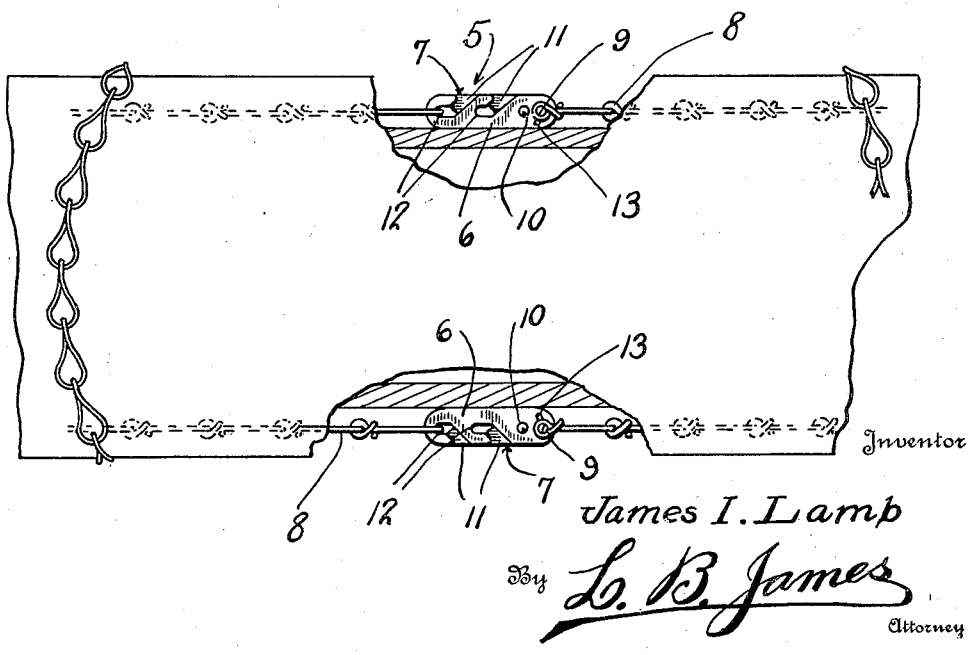
Fig. 2 is a plan view thereof.

In the present embodiment of this invention, the numeral 5 designates a locking device consisting of companion jaws 6 and 7, adapted to be secured to one end of each side section of a tire chain, indicated at 8, by a bolt or the like 9.

Adjacent the securing bolt 9, the jaws are permanently secured in pivotal relation by a pin 10 and, outwardly of the pivotal pin 10, the jaws are provided with opposed diagonal slots 11 which terminate in notches 12 for the reception of the free end of the chain.

The aforesaid bolt 9 loosely passes through aligned arcual or diagonal slots 13 in the jaws 6 and 7 and, through the provision of the arcual slots 13 the bolt 9 actuates the jaws toward one another when open and upon lodging in notches 14 communicating with the slots 13, the bolt becomes locking means for retaining the jaws in closed position.

With the jaws thus constructed and assembled, it will be observed that a selected link of a tire chain can readily be disposed within either of the aligned slots 11 for securing a chain together and, upon closing the jaws with tension on the chain, the bolt 9 will lodge in the notches 14 communicating with the slots 13, whereupon the jaws will be further locked against outward movement.

To still further maintain the security of the locking device, the jaws are disposed so as to rest edgewise against the side of a tire and, through the tension of the chain, any outward movement of the jaws will be resisted.

With this invention fully set forth, it is manifest that a locking device of great security is provided and, through the simplicity of the assemblage involved, it can be manufactured at a reasonable cost.

Having thus described my invention, what I claim and desire to protect by Letters Patent is:

A locking device of the character set forth comprising companion locking jaws pivotally connected together and having diagonal slots extended inwardly from opposed edges on one side of the pivotal connection thereof and other slots on the opposite side of the pivotal connection of the jaws having their major portions extending obliquely outward and toward the pivotal connection of the jaws with their inner extremities lying in alignment with a line passing through the inner extremities of the first mentioned slots and pivotal connection of the jaws, and a pin passing through the last mentioned slots.

In testimony whereof I affix my signature.

JAMES I. LAMB.